United States Patent
Holmberg et al.

(10) Patent No.: US 11,597,652 B2
(45) Date of Patent: *Mar. 7, 2023

(54) CARBON NANOFIBER HAVING EMBEDDED CARBON NANOTUBES, AND METHOD OF MANUFACTURE

(71) Applicant: Cence Inc., Novato, CA (US)

(72) Inventors: Sunshine Holmberg, Lake Elsinore, CA (US); Stoyan Atanassov Radkov, Gerrards Cross (GB)

(73) Assignee: Cence, Inc., Novato, CA (US)

(*) Notice: Subject to any disclaimer, the term of this patent is extended or adjusted under 35 U.S.C. 154(b) by 942 days.

This patent is subject to a terminal disclaimer.

(21) Appl. No.: 16/198,185

(22) Filed: Nov. 21, 2018

(65) Prior Publication Data
US 2020/0156945 A1    May 21, 2020

(51) Int. Cl.
| | |
|---|---|
| *B32B 9/00* | (2006.01) |
| *C01B 32/166* | (2017.01) |
| *D01F 9/12* | (2006.01) |
| *B82Y 30/00* | (2011.01) |
| *B82Y 40/00* | (2011.01) |

(52) U.S. Cl.
CPC ............ *C01B 32/166* (2017.08); *D01F 9/12* (2013.01); *B82Y 30/00* (2013.01); *B82Y 40/00* (2013.01); *C01B 2202/22* (2013.01); *C01B 2202/34* (2013.01); *Y10T 428/30* (2015.01)

(58) Field of Classification Search
CPC .... Y10T 428/30; B82Y 30/00; Y10S 977/742
USPC ........................................................ 428/408
See application file for complete search history.

(56) References Cited

U.S. PATENT DOCUMENTS

| | | | | |
|---|---|---|---|---|
| 2011/0130592 A1* | 6/2011 | Wolf | .................... | C07C 209/36 564/420 |
| 2011/0280793 A1* | 11/2011 | Keller | .................. | D04H 1/4242 423/447.2 |
| 2012/0252662 A1* | 10/2012 | Assmann | ............... | B82Y 40/00 502/165 |

* cited by examiner

*Primary Examiner* — Daniel H Miller
(74) *Attorney, Agent, or Firm* — Dunlap Bennett & Ludwig, PLLC

(57) ABSTRACT

A method of producing Stress Activated Pyrolytic Carbon-Carbon NanoTube (SAPC-CNT) fibers is disclosed. The fibers are a composite consisting of a tubular core of pristine graphite planes that include carbon nanotubes (CNTs) surrounded by semi-graphitic carbon material that includes Stress Activated Pyrolytic Carbon (SAPC), the SAPC being characterized by wavy graphite planes ranging from 0.1 nm to 1 nm and oriented parallel to the axis of each fiber, the semi-graphitic carbon material also being characterized by an inclusion of 4 to 10 atomic percent of nitrogen heteroatoms, the nitrogen heteroatoms including an above 60% of quaternary and pyridinic nitrogen groups.

16 Claims, 12 Drawing Sheets

CARBON NANOFIBER HAVING EMBEDDED CARBON NANOTUBES, AND METHOD OF MANUFACTURE

BACKGROUND

I. Field

This disclosure relates to carbon nanofibers having novel and advantageous properties. This disclosure also relates to methods of manufacturing such carbon nanofibers.

II. Background

Carbon is among a few elements having a high level of chemical bonding flexibility. This flexibility lends itself to the formation of a large variety of allotropes including diamond, graphite, and fullerenes which, while all being composed essentially of elemental carbon, vary widely in their properties. One particular relevant field of interest is the formation of Carbon NanoFibers (CNFs) and Carbon NanoTubes (CNTs). While CNFs and CNTs are both nanometer in scale and produced in similar manners, there are distinct differences that impact their manufacturability and chemical and physical properties. However, the complete range of different CNT and CNF materials has not been fully explored.

BRIEF DESCRIPTION OF THE DRAWINGS

The features and nature of the present disclosure will become more apparent from the detailed description set forth below when taken in conjunction with the accompanying drawings in which reference characteristics identify corresponding items.

DETAILED DESCRIPTION

Figure 1:
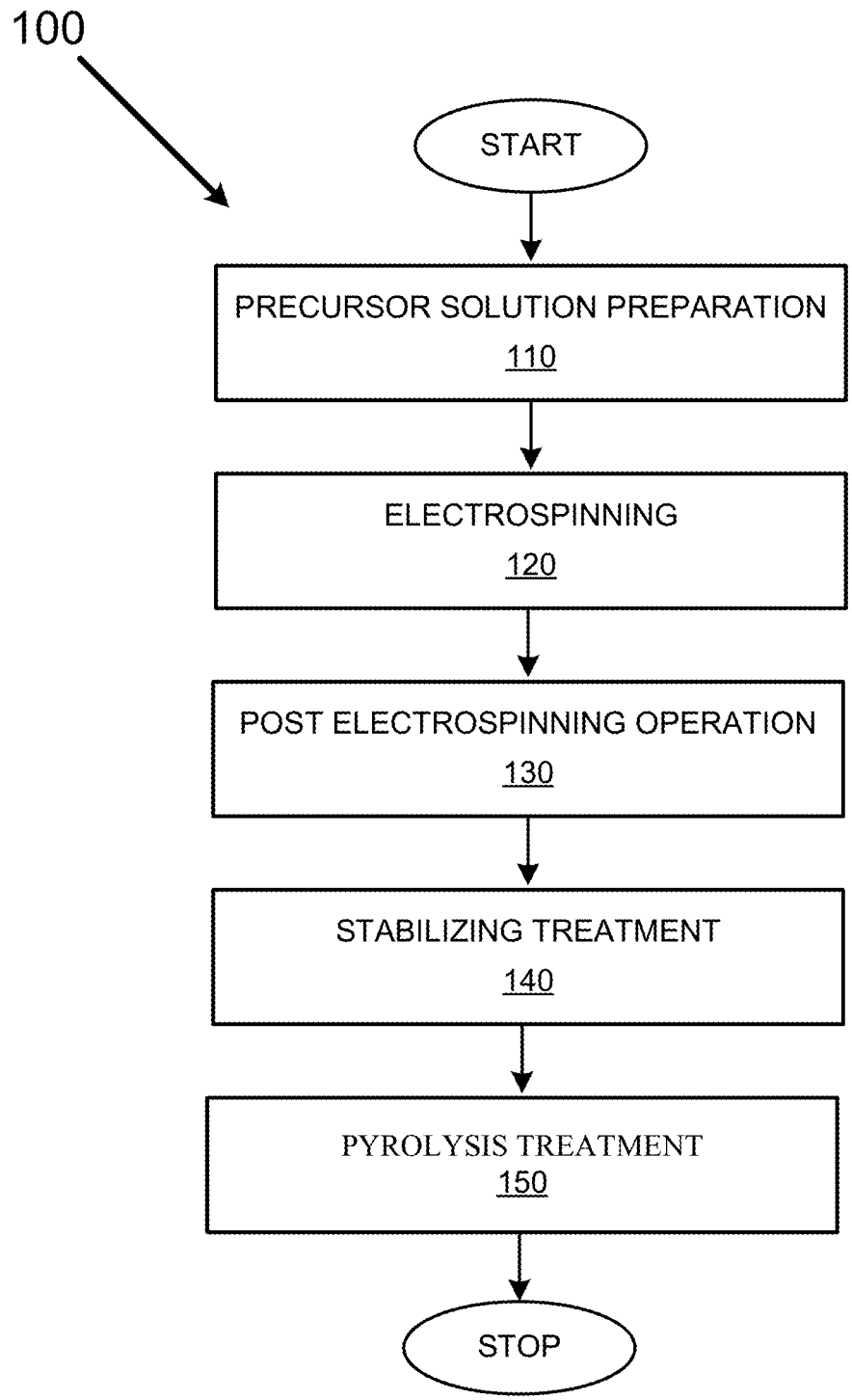
FIG. 1 is a flowchart outlining an exemplary operation for manufacturing a novel Carbon NanoFibers (CNFs).

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

The following special definitions apply for this disclosure.

The term "appreciable" refers to some quality, e.g., a particular amount or percentage, of something that results in a detectable difference either from a defined base-line or over prior-art materials. Such quality should be detectable either directly through observation, e.g., through a Scanning Electron Microscope (SEM) or a Transmission electron microscope (TEM), or indirectly through physically and/or chemically detectable properties, e.g., electron mobility, conductivity, etc.

The term "about" refers to variations expected in industrial manufacturing equipment for CNFs that may vary for different forms of equipment. For example, it is expected that even the most expensive high-voltage equipment will likely produce voltage outputs that vary a few percent.

The term "about" also refers to variations in an end product that are expected to occur even when reasonable quality controls are employed.

The term "Stress Activated Pyrolytic Carbon," or "SAPC," refers to the novel composition based on carbon and nitrogen that is the subject of this disclosure. SAPC, by the definition of this disclosure, refers to an inclusion of a semi-graphitic carbon material characterized by wavy graphite planes ranging from 0.1 nm to 1 nm and oriented parallel to an axis of a respective carbon nanofiber. The term "oriented parallel" refers to the general direction of a main surface of a particular graphitic plane and takes into account that variations in angle are expected to occur based on the "wavy" physical nature of SAPC.

The semi-graphitic carbon material of this disclosure is also characterized by an inclusion of 4 to 10 atomic percent of nitrogen heteroatoms with the nitrogen heteroatoms including a combined percentage of quaternary and pyridinic nitrogen groups equal to or greater than 60% of the nitrogen heteroatoms. However, it is to be appreciated that various "levels of SAPC quality" may be obtained using variations within the prescribed limits and ranges of the disclosed methods and systems, and that a "level of SAPC quality" as used in this disclosure refers to a minimum combined percentage of quaternary and pyridinic nitrogen groups of the nitrogen heteroatoms.

For example, one particular "level of SAPC quality" may refer to the combined percentage of quaternary and pyridinic nitrogen groups exceeding 70%, a second particular "level of SAPC quality" may refer to the combined percentage of quaternary and pyridinic nitrogen groups exceeding 80%, and a third particular "level of SAPC quality" may refer to the combined percentage of quaternary and pyridinic nitrogen groups exceeding 90%.

The lowest SAPC quality is to be considered an "appreciable," i.e., detectable, combined percentage of quaternary and pyridinic nitrogen groups. However, the lowest SAPC quality of interest is not expected to be less than 60%.

Testing by the inventors of the disclosed method and systems indicates that the uppermost range of SAPC quality according to the presently-disclosed methods and systems exceeds 90%.

FIG. 1 is a flowchart outlining an exemplary operation for manufacturing a novel SAPC-based Carbon NanoFibers (CNFs).

The process starts in step S110 where a precursor solution is prepared. The particular precursor solution in the present embodiment is a Polyacrylonitrile (PAN) based precursor solution that includes: (1) PAN having a molecular weight ranging from 100,000 to 500,000, (2) Carbon NanoTubes (CNTs); and (3) a suitable solvent having less than 5% water by weight.

The PAN-CNT-based precursor solution of the present example includes 0.5% to 20% PAN and CNTs (combined) by weight of the solution. However, in varying embodiments the exact percentage of PAN and CNTs to solvent may vary beyond the 0.5% to 20% range used in the present examples, and it is to be appreciated that, in still other examples, very little to no CNTs may be added.

In yet other examples, the PAN-CNT-based precursor solution of the present example includes 6.0% to 20% PAN and CNTs (combined) by weight of the solution, and in still other examples the PAN-CNT-based precursor solution of the present example includes 0.5% to 5% PAN and CNTs (combined) by weight of the solution. Within the 0.5% to 5% PAN+CNTs example, more refined processes may require a lower range of PAN+CNTs varying from 0.5% to 2.5% and a higher range of PAN+CNTs varying from 3% to 5%.

As to the amount of CNTs added in the PAN-CNT-based precursor solution, various examples envision instances where CNTs vary from 0.01% to 0.5% of any usable PAN+CNTs range. For instance, in the 0.5% to 20% PAN+CNTs range mentioned above, CNTs may comprise as little as 0.01%, 0.1% or 0.5% by weight at the low end, and may comprise as much as 19.5%, 19.9% and 19.99% by weight at the high end.

Possible solvents include, for example, Dimethylsulfoxide (DMSO), and Dimethylformamide (DMF). However, a combination both of DMSO or DMF may be used, and in varying instances, one or both of DMSO or DMF may be used in combination with other solvents. Further, other solvents and precursors than those expressly described above may be used at a possible reduction in the quality of end product.

Preparing the PAN-CNT-based precursor solution includes dissolving the PAN and CNTs in the solvent via a convective mixing operation at a temperature ranging from 25° C. to 130° C. until the PAN and CNTs are completely dissolved. Alternatively, the PAN-CNT-based precursor solution may be mixed for a set time period ranging from, for example, one hour to one week while at the previously-described temperature range.

Next, in step S120, the PAN-CNT-based precursor solution is provided to a spinneret, and in step S130 an electro-spinning operation is performed on the PAN-CNT-based precursor solution to create one or more PAN-CNT-based fibers.

Figure 2:
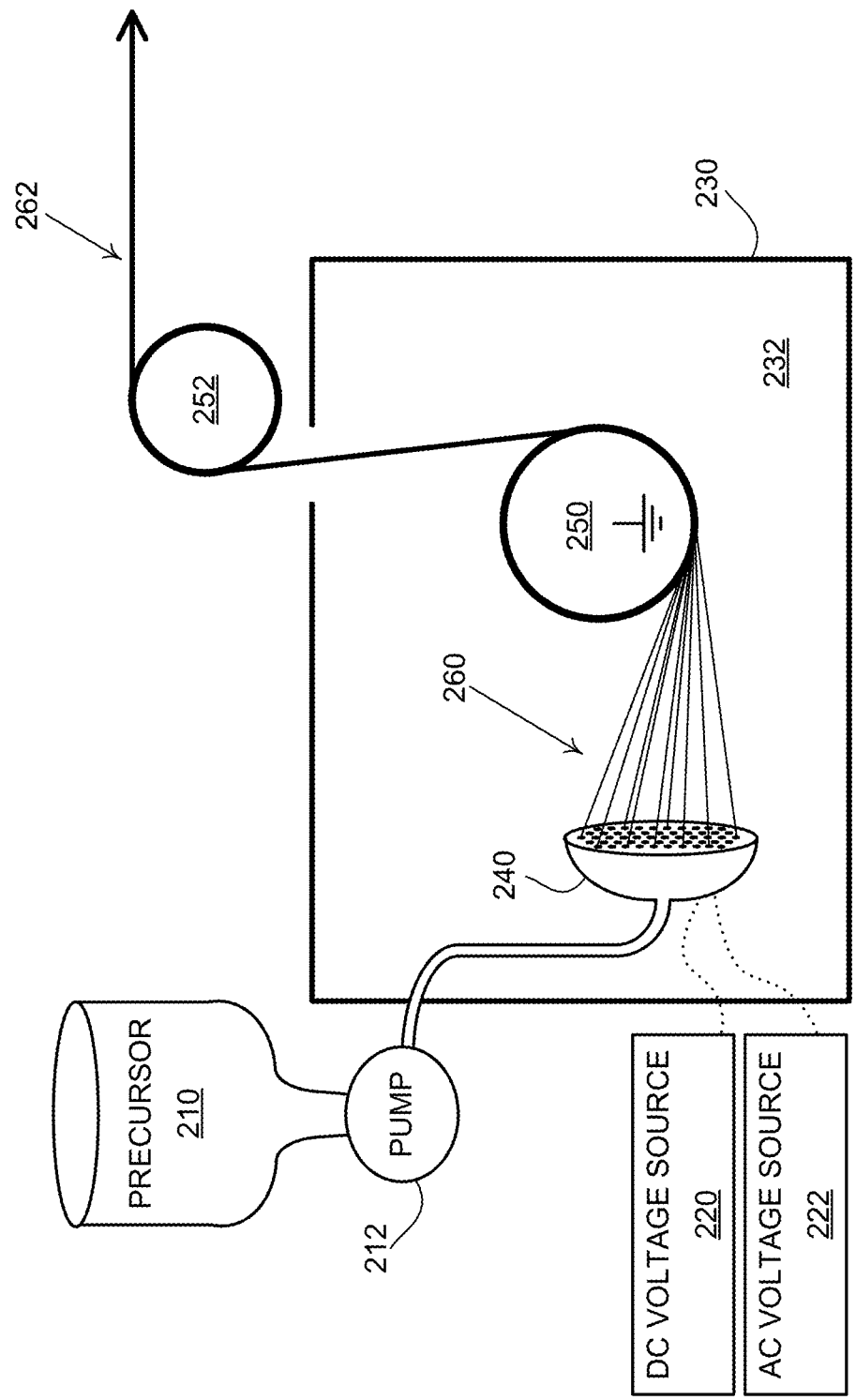
FIG. 2 depicts an example of an electro-spinning device usable to produce the novel CNFs discussed with respect to FIG. 1.

Referring to FIG. 2, an example of an electro-spinning device usable to produce the SAPC-based CNFs is disclosed. The electro-spinning device includes a precursor container 210, a pump 212, a Direct Current (DC) voltage source 220, an Alternating Current (AC) voltage source 222, an enclosure 230 and an external drum 252. The enclosure 230 has disposed within a spinneret 240 and a collector drum 250 surrounded by an atmosphere 232.

The example spinneret 240 of FIG. 2 is a needleless (i.e., nozzle) device. While needleless spinnerets can take many forms, needleless spinnerets are often categorized into two forms: stationary and rotating. For example, in one embodiment, a needleless spinneret can take the form of a stationery conductive metal string. In other embodiments, needless spinnerets can take the form of a drum or drum-like object that rotate inside a bath of precursor solution.

While the example spinneret 240 of FIG. 2 is needleless, in still other embodiments any number of needle-type spinnerets may be used, such as a single needle spinneret, a multiple needle spinneret, and so on. Many needle spinnerets are described as "straw-like" while other needle spinnerets are described as "coaxial." Coaxial spinnerets can produce "core and shell" fibers or even fibers with multiple shells.

In addition to known needle and needless devices, it is envisioned that the term "spinneret" can include future-developed needle devices, future-developed needless devices and any other known or later developed type of spinneret that does not conveniently fit within the characterizations of "needle" or "needleless." By way of example, by providing an atomized mist of the PAN-precursor into a volume of space and then "blasting" the individual PAN-precursor particles constituting the mist towards a collector using an appropriate gas or vapor, it is possible to produce a number of fine fibers.

In operation, the pump 212 provides the PAN-CNT-based precursor from the precursor container 210 to the spinneret 240. The spinneret 240, in turn, ejects a plurality of fiber streams 260 to the collector drum 250, and it is at this time that the PAN-CNT-based precursor is processed to form PAN-CNT-based fibers 262. The resulting combined PAN-CNT-based fibers 262 are then passed to the external drum 252 for collection and storage. While the example spinneret 240 is generally circular and the example collector 250 is drum-shaped, it is to be appreciated that the particular configuration of the spinneret 240 and the collector 250 may vary as is known to those skilled in the relevant arts.

Within the operation of the embodiment of FIGS. 1-2, the distance between the spinneret 240 and the collector drum 250 may vary substantially to include distances ranging from 1 cm to 30 cm, and in other embodiments the distance between the spinneret 240 and the collector drum 250 may exceed 30 cm.

As the fiber streams 260 are passed from the spinneret 240 to the collector drum 250, the DC voltage source 220 and the AC voltage source each provide a differential voltage between the spinneret 240 to the collector drum 250 in such a way as to materially alter the resultant PAN-CNT-based fibers 262.

For example, by providing a DC voltage ranging from about plus or minus 1000 V to about plus or minus 30,000 V between the spinneret 240 and the collector 250 while passing the fiber streams 260, the streams of PAN-CNT-based precursor are drawn to the collector 250 while being processed. In addition, the physical dimensions and shape of the resultant PAN-CNT-based fibers 262 may be affected so as to produce PAN-CNT-based fibers having reduced dimensions. Details regarding an example application of a DC voltage used in an electro-spinning operation may be found in, for example, Ghazinejad, Holmberg et al, "Graphitizing Non-graphitizable Carbons by Stress-induced Routes" published Nov. 29, 2017, by Nature.com (www.Nature.com/scientificreports), the content of which is incorporated by reference in its entirety.

Further, by providing an appropriate AC voltage between the spinneret 240 and the collector drum 250, the physical and chemical properties unique to SAPC are enabled. In various embodiments, the AC voltage will include one or more signals each having: (1) a base frequency ranging from 20 Hz to 100,000 Hz, and (2) either a Peak-to-Peak (P-P) voltage ranging from 100 V to 30,000 V or a Root-Mean-Square (RMS) voltage ranging from 100 V to 30,000 V.

Also in various embodiments, the one or more voltage signals may be any of a variety of AC signal types, such as a sine wave, a square wave, a triangle wave or combinations thereof.

In other embodiments, however, the AC voltage provided may not be strictly periodic but may consist of, or include, a random signal, a pseudo-random signal or a signal that appears as white noise, filtered (pink) noise, noise in a Gaussian distribution or noise in any other distribution.

It is envisioned that different precursors will react to different AC voltage stimuli. Accordingly, it should be appreciated that a particular voltage-to-current response over a given frequency band for a given precursor may reveal frequencies of interest. In various examples, a voltage-to-current response may be performed using a frequency sweep method where a single AC sine wave varies from one frequency limit to another frequency limit. However, it should also be appreciated that a voltage-to-current response may be performed by applying some form of noise while determining current draw for narrow frequency bands. By taking such measurements, it should be appreciated that an AC frequency stimuli to a particular precursor can be improved and/or optimized.

Returning to FIG. 2, the atmosphere 232 within the container 230 where the electro-spinning operation (e.g., step S120) is performed contains a vapor of the precursor solution solvent at a temperature ranging from 10° C. to 100° C. with a saturation larger than 10%. However, in various embodiments the minimum saturation may exceed 45% at an ambient (sea level) atmosphere.

Figure 2B:
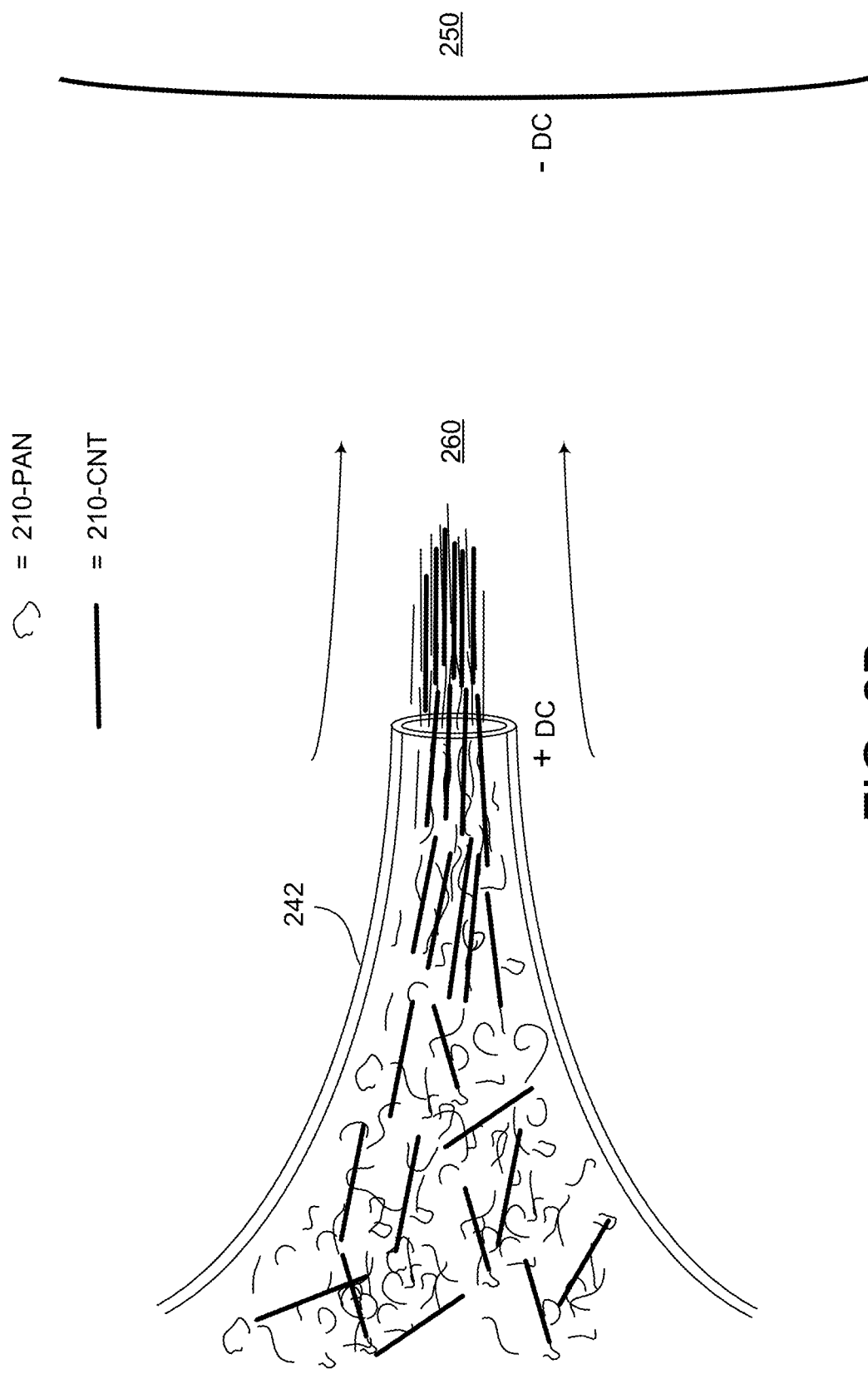
FIG. 2B depicts an example of a single nozzle of the electro-spinning device usable to produce the novel CNFs discussed with respect to FIG. 1.

FIG. 2B depicts an example of a single nozzle 242 of the electro-spinning device usable to produce the novel CNFs discussed with respect to FIG. 1. As shown in FIG. 2B, a PAN-CNT-based precursor 210 is provided to the spinneret nozzle 242 with the CNTs 210-CNT (denoted by heavy lines) being intermixed with PAN polymer molecules 210-PAN (denoted by thin lines).

As the PAN-CNT-based precursor is extruded from the nozzle 242 to the collector 250 (aided by a DC voltage), the CNTs 210-CNT are aligned along the length-dimension of individual fiber streams 260. At the same time, individual PAN polymer molecules 210-PAN are uncurled and forced to stretch out along the same dimension.

Returning to FIG. 1, after the electro-spinning operation of step 120, a post-electro-spinning operation S130 is performed on the resultant PAN-CNT-based fibers. According to the present disclosure, the post-electro-spinning operation S130 will include both a mechanical treatment and a chemical treatment.

The mechanical treatment of the post-electro-spinning operation S130 includes hot-rolling and hot-drawing.

The hot-rolling treatment is designed to mechanically compress the resultant PAN-CNT-based fibers at a stress ranging from 20 kPa to 2000 kPa while at temperature ranging from 50° C. to 300° C. However, in other embodiments the temperature and/or the stress applied may extend beyond their respective cited ranges although the quality of the end product may differ.

The hot-drawing treatment is designed to stretch the one or more fibers from 5% to 50% of an original length of the resultant PAN-CNT-based fibers. However, as with hot-rolling treatment, the amount of stretching may exceed the cited range.

The chemical treatment of the post-electro-spinning operation includes dipping the resultant PAN-CNT-based fibers in a 5% to 30% hydrogen peroxide solution followed by removing any remaining solvent and/or any remaining hydrogen peroxide from the resultant PAN-CNT-based fibers. However, any chemical treatment suitable to appropriately clean the resultant PAN-CNT-based fibers is envisioned.

Continuing, a stabilizing treatment S140 on the PAN-CNT-based fibers, which generally involves heating the PAN-CNT-based fibers, is performed. The stabilizing treatment S140 may be performed during or after the mechanical treatment of step 130.

If the stabilizing treatment S140 is performed during the mechanical treatment, the stabilizing treatment S140 will include heating the PAN-CNT-based fibers at a temperature ranging from 200° C. to 300° C. while performing the mechanical treatment.

If the stabilizing treatment S140 is performed after the mechanical treatment, the stabilizing treatment S140 will include heating the one or more PAN-CNT-based fibers at a temperature ranging from 200° C. to 400° C.

After performing the post-electro-spinning operation and stabilizing treatment of steps S130 and S140, a pyrolysis treatment S150 on the PAN-CNT-based fibers is performed. Generally, the pyrolysis treatment S150 will include heating the PAN fibers in an inert atmosphere containing less than one-percent (1%) oxygen, and will include three separate operations.

The first operation of step S150 involves a heating of the PAN-CNT-based fibers that takes place in an inert atmosphere, preferably an oxygen-free atmosphere, but generally an atmosphere where oxygen does not exceed one percent. During the first operation, temperature will be maintained between 200° C. to 400° C. for a time ranging from one hour to five hours.

The second operation of step S150 also involves a heating of the PAN-CNT-based fibers in an inert atmosphere. During the second operation, temperature will be maintained between 600° C. to 2000° C. for a time ranging from one hour to five hours.

The third operation of step S150 is a cooling operation where temperature is slowly decreased to room temperature.

It is to be appreciated that, for all three operations of the pyrolysis treatment S150, the temperature ramp rate should not exceed 20° C./minute.

In view of the discussion above, it should be appreciated that the combined percentage of quaternary and pyridinic nitrogen groups will be affected by at least: (1) the choice and/or exact composition of polymer precursor, the AC signal of the electro-spinning operation and the particular pyrolysis treatment used. Accordingly, appropriate choices within the disclosed ranges will cause the combined percentage of quaternary and pyridinic nitrogen groups to exceed, for example, 70%, 80% and even 90%.

Figure 3:
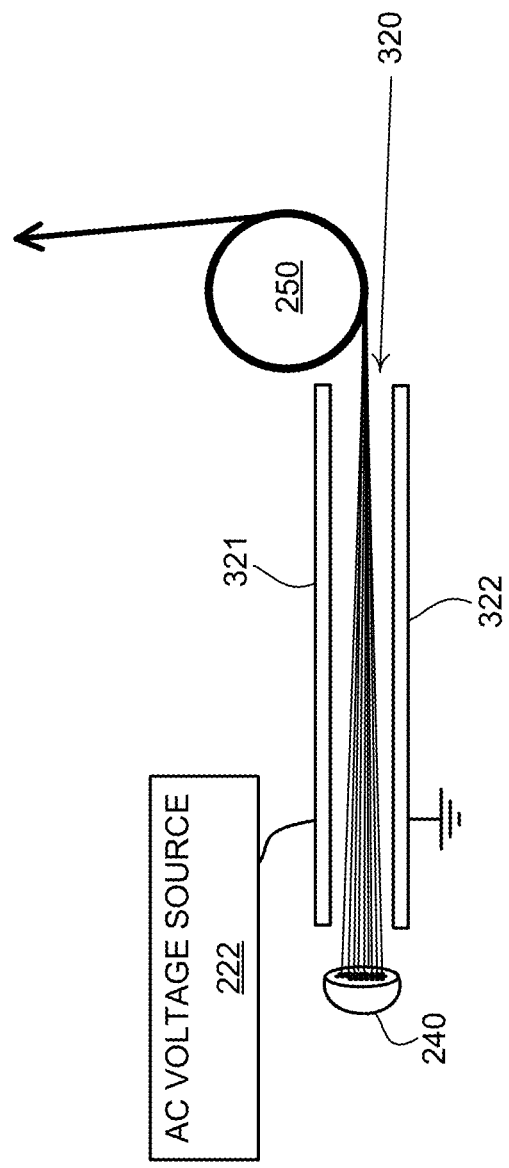
FIG. 3 depicts a variant of the electro-spinning device of FIG. 2, which is also usable to produce the novel CNFs discussed with respect to FIG. 1.

FIG. 3 depicts a variant of the electro-spinning device of FIG. 2, which is also usable to produce the novel CNFs of this disclosure. In the embodiment of FIG. 3, instead of providing an AC voltage between the spinneret 240 and the collector drum 250, the AC voltage source 222 is used to develop an electric field laterally across the fiber streams 260. As shown in FIG. 3, a channel 320 is formed between electrode 321 and electrode 322. Accordingly, as the AC voltage source provides an AC electric field between the electrodes {320, 321}, the fiber streams 260 will be affected by the AC electric field as the resultant PAN-CNT-based fibers 262 are produced.

Figure 4B:
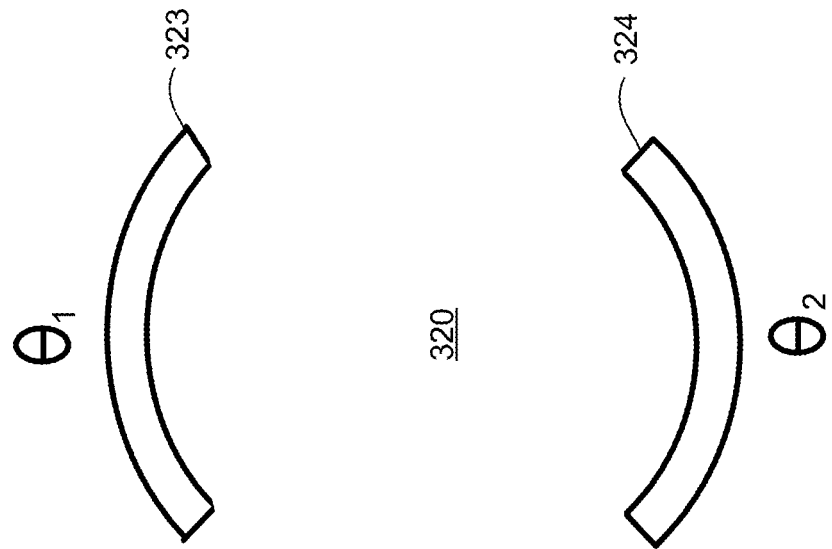
FIGS. 4A-4J depict various electrode configurations for the electrodes shown in FIG. 3.
Figure 4A:
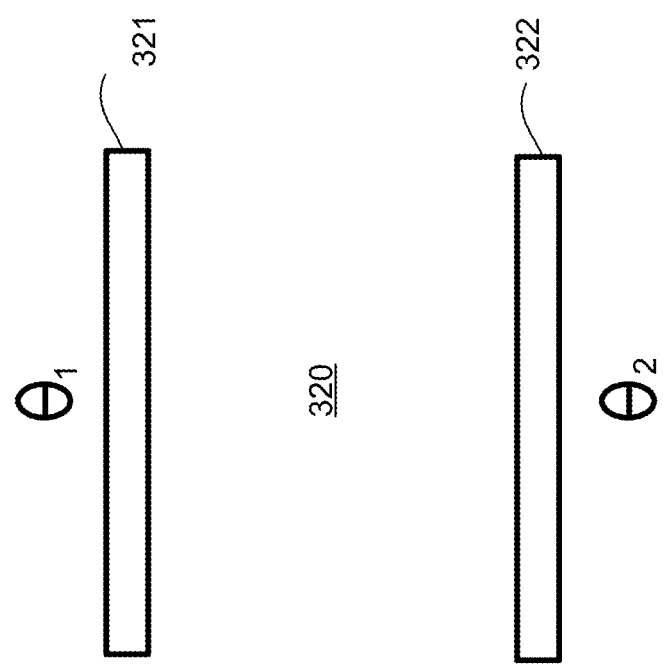
Figure 4D:
Figure 4C:
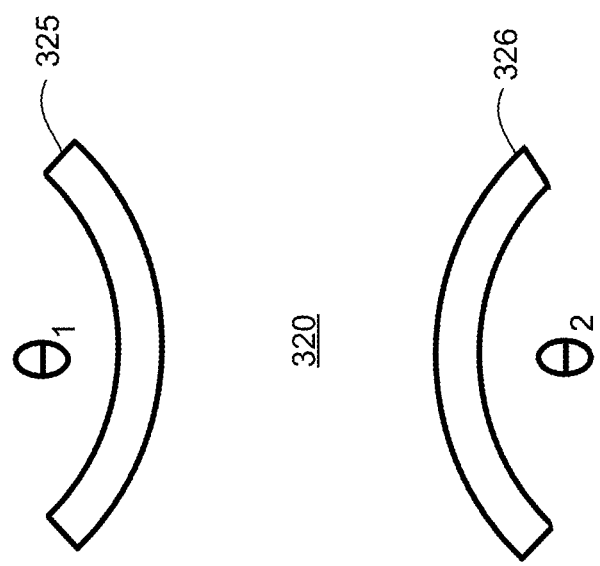

FIG. 4A depicts a view of channel 320 along the length of the channel 320 so as to provide a profile of electrode shape. As shown in FIG. 4A, the electrodes {321, 322} of FIG. 3 are plate-shaped. However, as shown in FIG. 4B, the electrodes {321, 322} of FIG. 3 may be substituted with electrodes {323, 324}, which are curved to form concave arcs towards the channel 320. Similarly, the electrodes {325, 326} of FIG. 4C may be used, which are curved to form convex arcs towards the channel 320, and as another variant the round wire electrodes {327, 328} of FIG. 4D may be used.

Figure 4F:
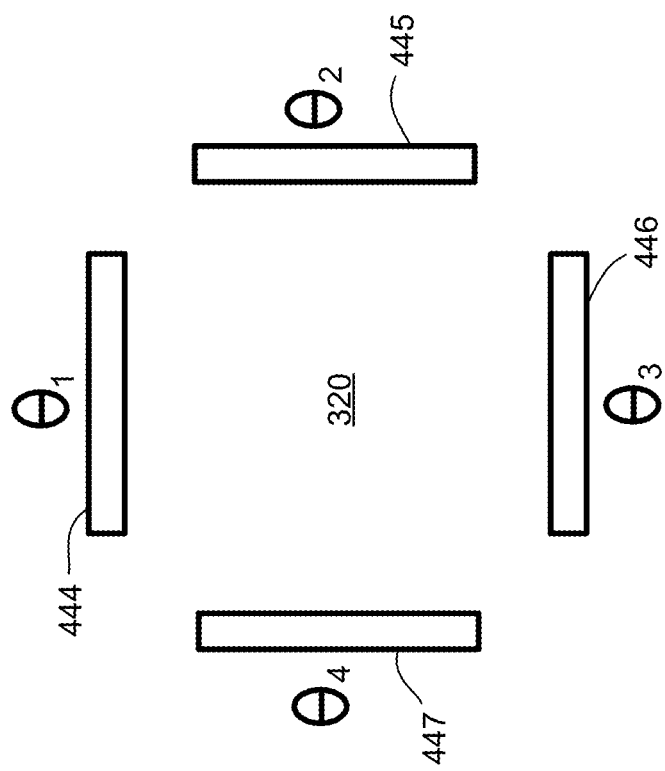
Figure 4E:
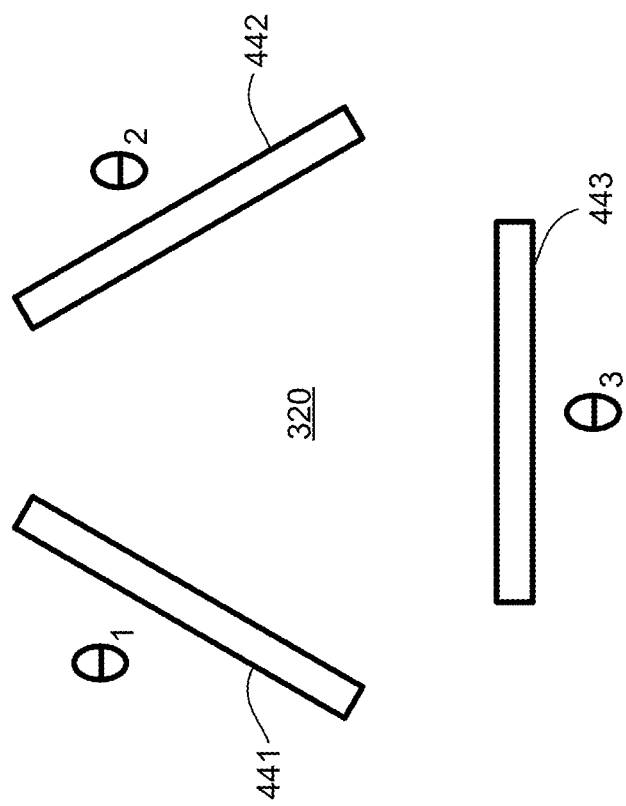
Figure 4H:
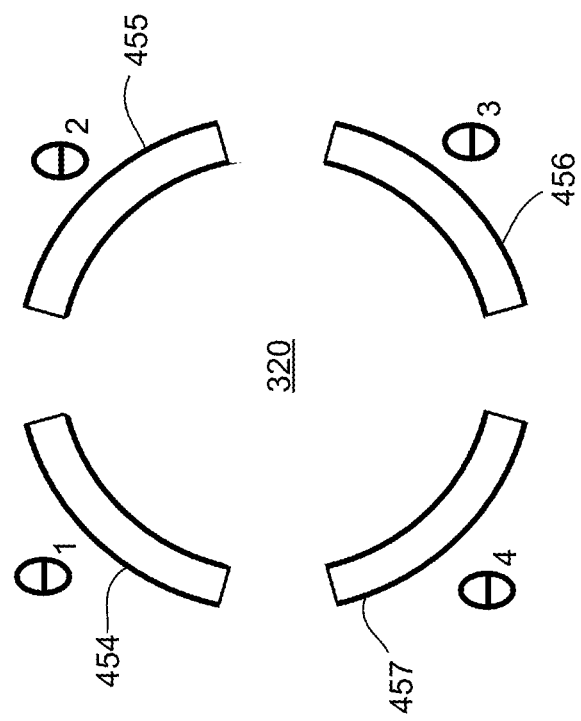
Figure 4G:
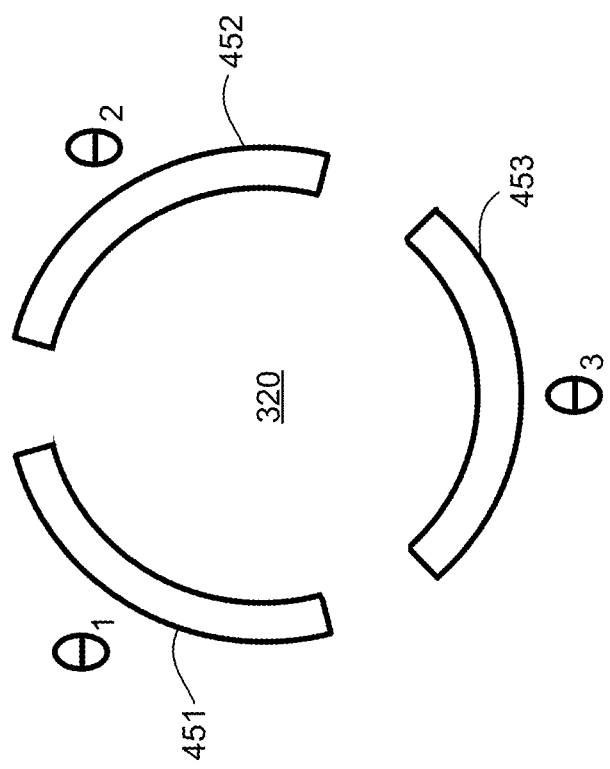
Figure 4J:
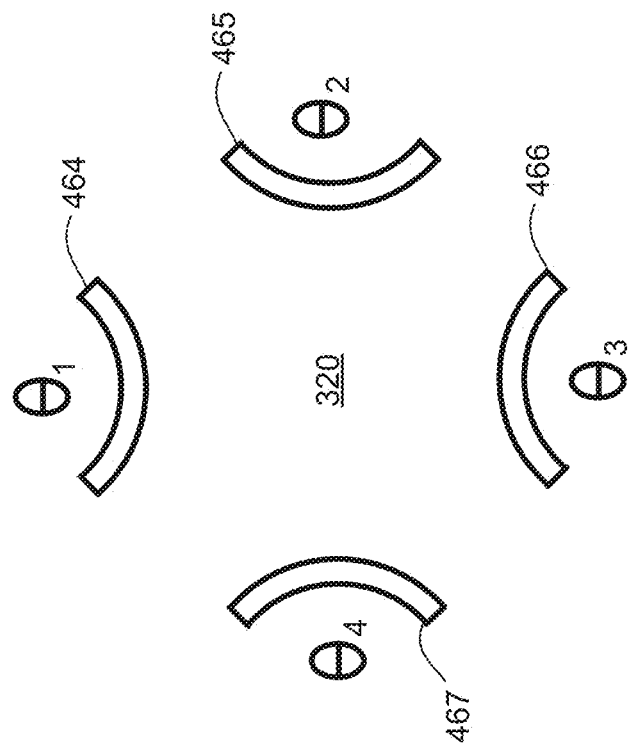
Figure 4I:
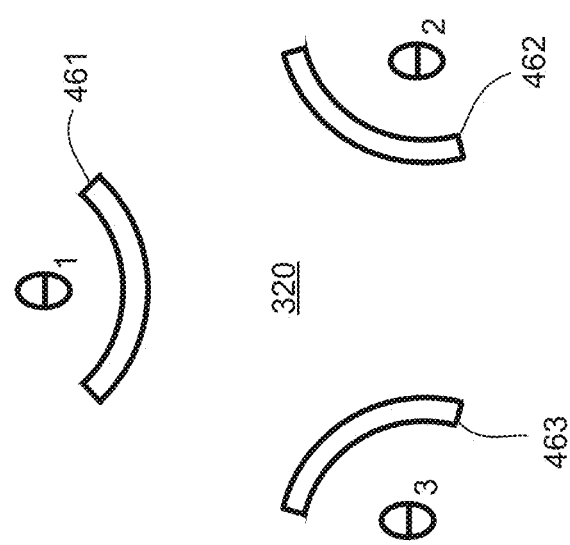

Turning to FIG. 4E-4J, it is to be appreciated that more than two electrodes may be used including the plate-shaped electrodes {441, 442, 443}, {444, 445, 446, 447} of FIGS. 4E-4F, the concave-shaped electrodes {451, 452, 453}, {454, 455, 456, 457} of FIGS. 4G-4H, and the convex-shaped electrodes {461, 462, 463}, {464, 465, 466, 477} of FIGS. 4I-4J.

It should be appreciated that, by using three or four electrodes of various configurations, an electric field may be generated that does not oscillate back and forth, but rotates about the center axis of the channel 320. Additionally, one or more rotating fields may be used independently or in combination with one or more alternating fields.

For example, by using the four electrodes {444, 445, 446, 447} of FIG. 4F, it is possible to produce a clockwise rotating electric field that rotates about channel 320 at a rate of 20,000 Hz, a counter-clockwise rotating electric field that rotates about channel 320 at a rate of 51,000 Hz, a first oscillating electric field that oscillates between electrodes {444, 446} at a rate of 150,000 Hz, and a second oscillating electric field that oscillates between electrodes {445, 447} at a rate of 210,000 Hz.

Figure 5:
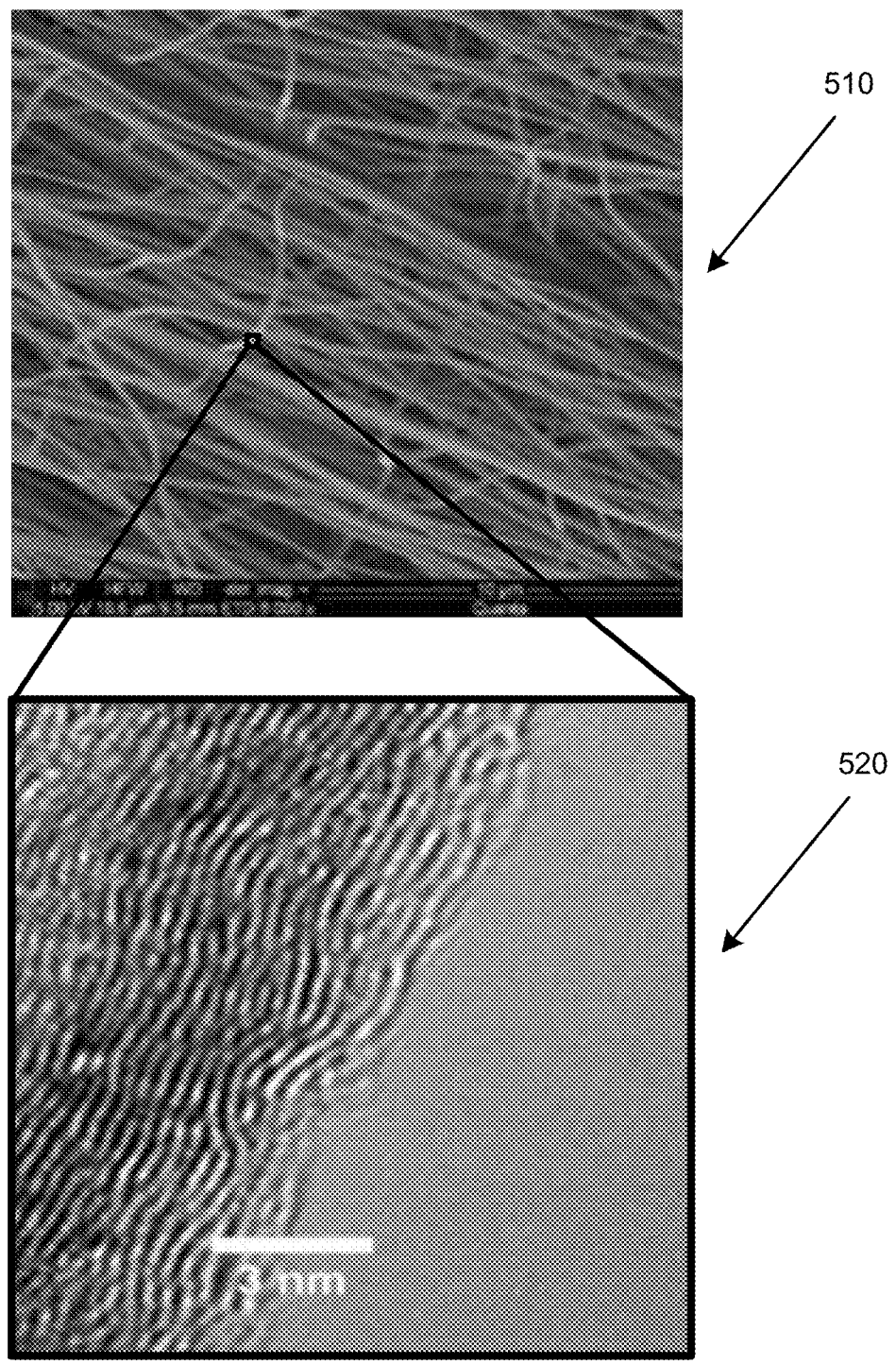
FIG. 5 provides visual representations of the novel CNFs produced by the methods and systems of this disclosure.

FIG. 5 depicts an atomic view of SAPC-based carbon fibers. As shown in view 510 of FIG. 5, a microscopic view of a mass of SAPC-based carbon nanofibers produced by the disclosed methods and devices is provided.

In contrast to view 510, in view 520 a Transmission Electron Microscope (TEM) image of SAPC for an exemplary CNF is provided. As shown in view 520, the exemplary CNF includes a semi-graphitic carbon material characterized by wavy graphite planes that are generally oriented parallel to an axis of the exemplary carbon nanofiber. While not shown in FIG. 5, X-ray Photoelectron Spectroscopy (XPS) confirms the presence of graphitic and pyridinic nitrogen groups, which grants SAPC with unique electrocatalysis orders of magnitude greater than similar materials.

Figure 6:
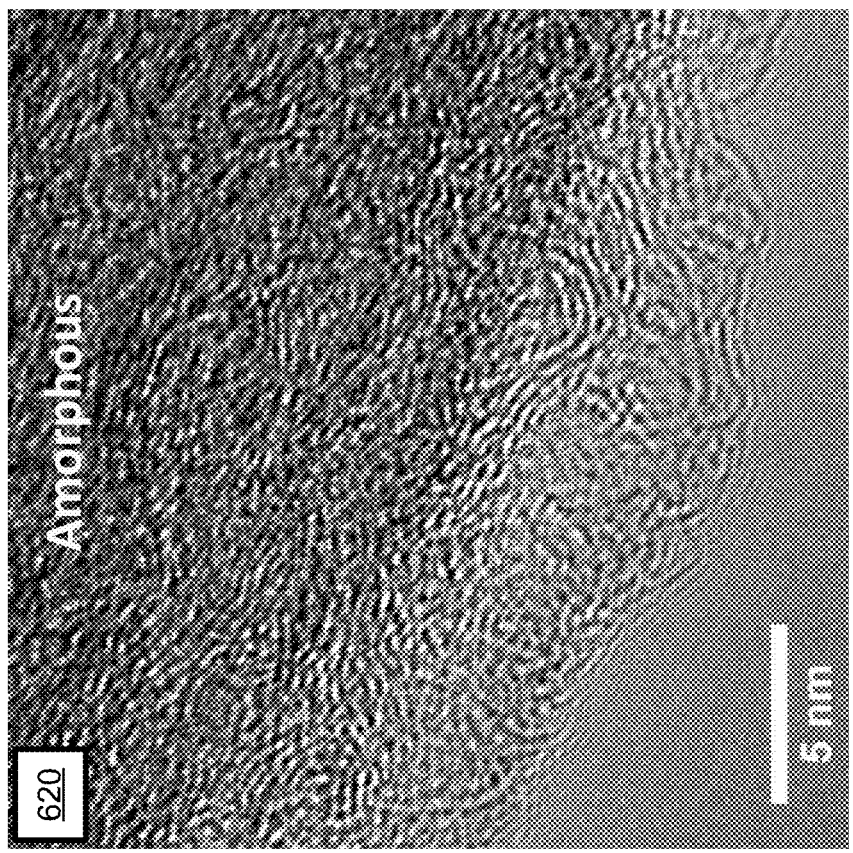
FIG. 6 provides a visual contrast of the novel CNFs produced by the methods and systems of this disclosure against other carbon-based materials.
Figure 6:
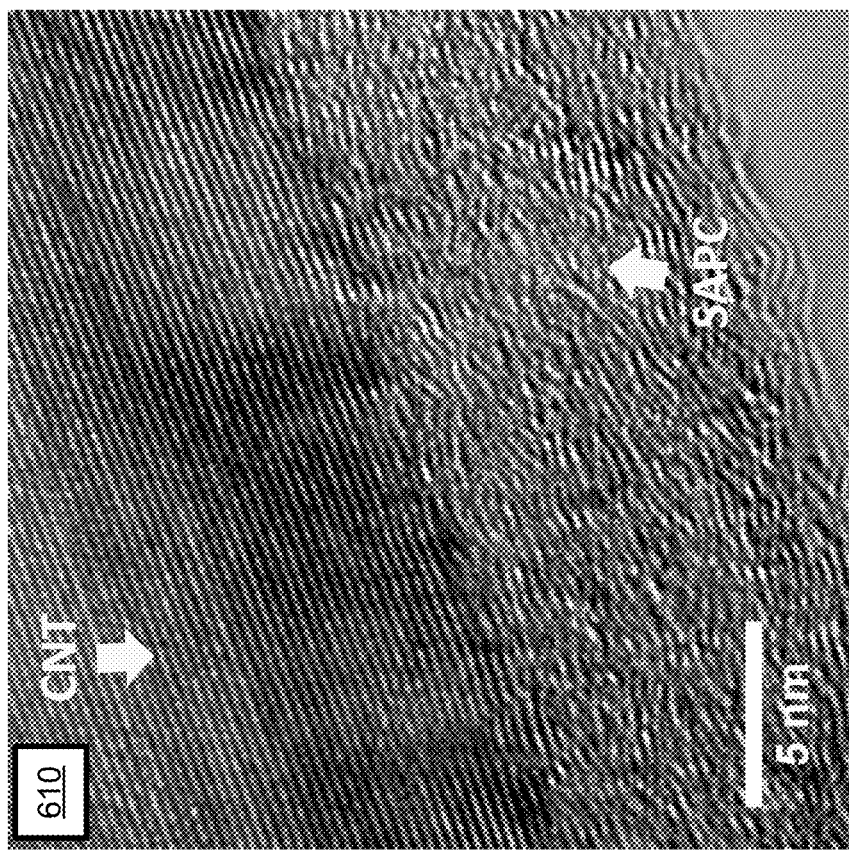

FIG. 6 provides comparative views of SAPC against other forms of carbon. As shown in view 610, a portion of an SAPC-CNT fiber is shown with the SAPC being next to CNTs embedded in the same fiber. The shown fiber is a composite consisting of a tubular core of "pristine" graphite planes that include CNTs surrounded by semi-graphitic carbon material that includes SAPC. In the present example, the SAPC is characterized by wavy graphite planes ranging from 0.1 nm to 1 nm and oriented parallel to the axis of each fiber. The semi-graphitic carbon material also being characterized by an inclusion of 4 to 10 atomic percent of nitrogen heteroatoms with the nitrogen heteroatoms including quaternary and pyridinic nitrogen groups having a percentage range of more than 60% and approaching 100%.

While is it observed that the word "pristine" has a known meaning in the relevant arts as referring to "defect free." However, in the present disclosure it is acknowledged that "pristine" may refer to a product having an inconsequential number of defects in light of the fact that commercially viable, man-made equipment and instruments rarely perform in a perfect fashion.

Continuing, as shown in view 620, an amorphous carbon composition, i.e., carbon nitrides, is provided. Carbon nitrides are similar to carbon black but include nitrogen groups instead of oxygen. Carbon nitrides come in powder form and, as can be seen in view 620, carbon nitride planes are not oriented in any particular direction.

Figure 7:
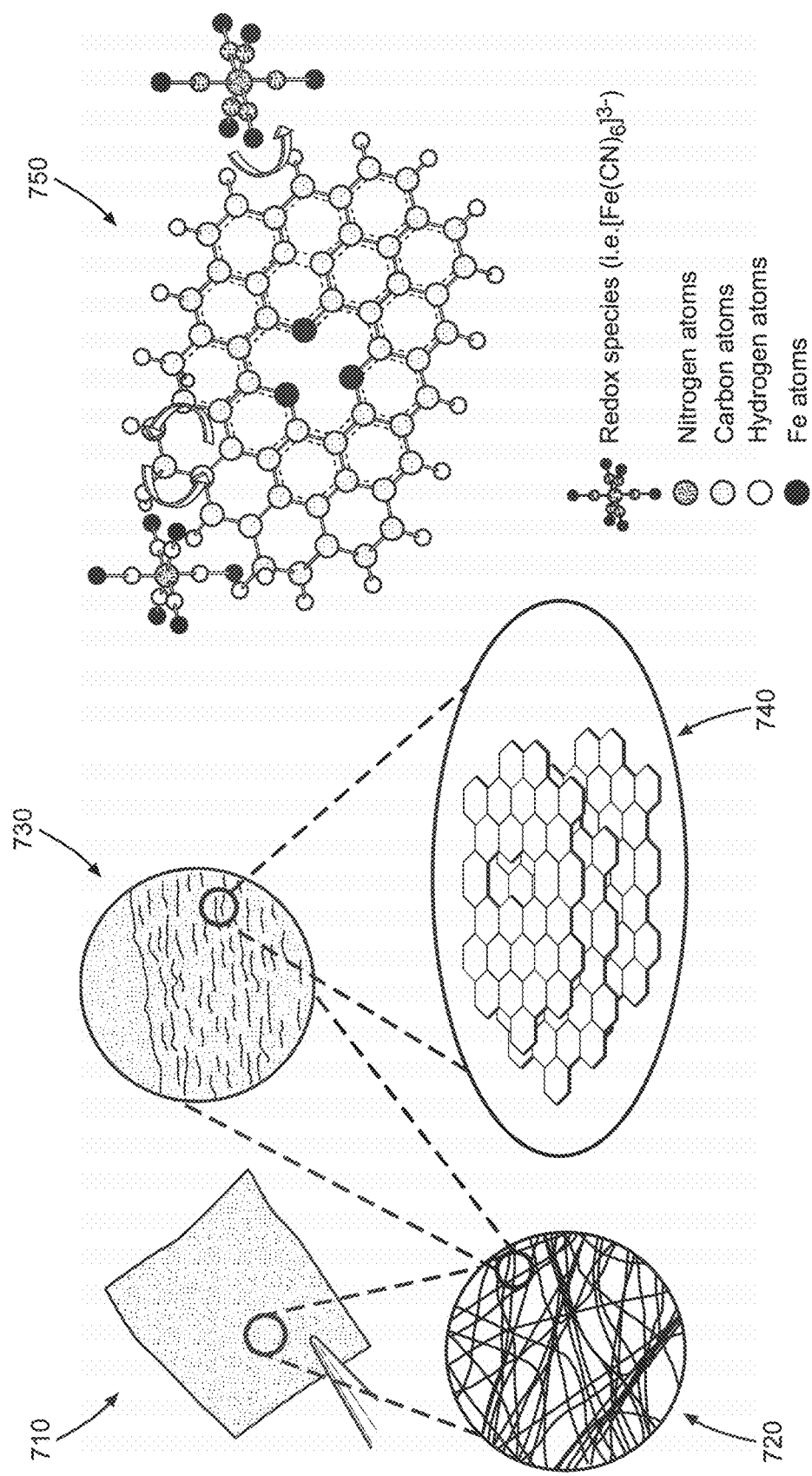
FIG. 7 provides series of visual representations of the novel CNFs produced by the methods and systems of this disclosure from the macro-scale to an atomic scale.

FIG. 7 shows five different views of SAPC. The first view (view 710) is an optical image of a mat of SAPC fibers held by a pair of tweezers. The second view (view 720) shows a microscopic view of individual SAPC nanofibers taken from the mat of SAPC nanofibers of view 710. The third view (view 730) is another atomic view of an individual SAPC nanofiber taken using a TEM process.

Continuing, view 740 shows an exemplary structure of several layers of SAPC with view 750 providing an exemplary molecular structure of a particular molecule/layer consistent with the above-described structure of SAPC. The redox species used to measure the electrochemical response in the example of view 750 is ferricyanide. However, any particular redox species, and other redox species, for example, dopamine and iridium hexachloride, can be used.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of producing one or more Stress Activated Pyrolytic Carbon-Carbon NanoTube (SAPC-CNT) fibers, the fibers being a composite consisting of a tubular core of pristine graphite planes that include carbon nanotubes (CNTs) surrounded by semi-graphitic carbon material that includes Stress Activated Pyrolytic Carbon (SAPC), the SAPC being characterized by wavy graphite planes ranging from 0.1 nm to 1 nm and oriented parallel to the axis of each fiber, the semi-graphitic carbon material also being characterized by an inclusion of 4 to 10 atomic percent of nitrogen heteroatoms, the nitrogen heteroatoms including an above 60% of quaternary and pyridinic nitrogen groups, the method for producing the SAPC-CNT fibers comprising:
    preparing a Polyacrylonitrile (PAN) based precursor solution infused with CNTs to produce a PAN-CNT precursor;
    providing the PAN-CNT precursor solution to a spinneret;
    performing an electrospinning operation on the PAN-CNT precursor solution to create the one or more fibers, wherein the electrospinning operation includes passing the PAN-CNT-based precursor solution from the spinneret to a collector at a distance between 1 cm to 30 cm while providing an Alternating Current (AC) voltage between the spinneret and the collector, the AC voltage having a frequency ranging from 20 Hz to 100,000 Hz and either a Peak-to-Peak (P-P) voltage ranging from 100V to 30,000V or a Root-Mean-Square (RMS) voltage ranging from 100V to 30,000V;
    performing a post-electrospinning operation on the one or more fibers, the post-electrospinning operation including a mechanical treatment and a chemical treatment;
    performing a stabilizing treatment on the one or more fibers, the stabilizing treatment including heating the one or more fibers; and
    after performing the post-electrospinning operation and stabilizing treatment, performing a pyrolysis treatment on the one or more fibers, the pyrolysis treatment including heating the one or more fibers in an inert atmosphere containing less than 1% oxygen.

2. The method of producing one or more SAPC-CNT fibers of claim 1, wherein the electrospinning operation further includes providing a Direct Current (DC) voltage between the spinneret and the collector at a distance between 1 cm to 30 cm while passing the PAN-CNT-based precursor solution from the spinneret to the collector, the DC voltage ranging from about plus or minus 1,000 V to about plus or minus 30,000 V.

3. The method of producing one or more SAPC-CNT fibers of claim 2, wherein the electrospinning operation is performed in an atmosphere containing vapor of the precursor solution solvent at a temperature ranging from 10° C. to 100° C. with a percent saturation larger than 10%.

4. The method of producing one or more SAPC-CNT fibers of claim wherein
the electrospinning operation is performed in an ambient atmosphere at a temperature ranging from 10° C. to 100° C. with minimum humidity 45%.

5. The method of producing one or more nanofibers of an SAPC-CNT-based of claim 1, wherein the PAN-CNT precursor solution includes 6% to 15% PAN by weight and 0.5-3% CNT by weight in a solvent.

6. The method of producing one or more nanofibers of an SAPC-CNT-based of claim 5, wherein the solvent includes at least one of Dimethylsulfoxide (DMSO) and mixture of DMSO, DMF and/or with less than 5% water.

7. The method of producing one or more SAPC-CNT fibers of claim 5, wherein preparing the PAN-CNT-based precursor solution includes dissolving the PAN in the solvent via a convective mixing operation at a temperature ranging from 25° C. to 130° C. until the PAN is completely dissolved or for 1 hr to 1 week, wherein the PAN has a molecular weight ranging from 100,000 to 500,000.

8. The method of producing one or more SAPC-CNT fibers of claim 1, wherein the mechanical treatment of the post-electrospinning operation includes one or both of hot-rolling and/or hot-drawing; and
the chemical treatment of the post-electrospinning operation includes dipping the one or more fibers in a 5% to 30% hydrogen peroxide solution followed by removing any remaining solvent and/or any remaining hydrogen peroxide from the one or more fibers.

9. The method of producing one or more SAPC-CNT fibers of claim 8, wherein
the hot-rolling mechanically compresses the one or more fibers at temperature ranging from 50° C. to 300° C. and a stress ranging from 20 kPa to 2000 kPa; and the hot-drawing stretches the one or more fibers 5%-50% of an original length of the one or more fibers.

10. The method of producing one or more SAPC-CNT fibers of claim 8, wherein the stabilizing treatment includes heating the one or more fibers at a temperature ranging from 200° C. to 300° C. while performing the mechanical treatment.

11. The method of producing one or more SAPC-CNT fibers of claim 1, wherein the stabilizing treatment includes:
heating the one or more fibers at a temperature ranging from 200° C. to 400° C.

12. The method of producing one or more nanofibers of an SAPC-CNT-based of claim 1, wherein the pyrolysis treatment includes:

performing first heating operation of the one or more fibers in the oxygen-free atmosphere at temperature between 200° C. to 400° C. for a time ranging from 1 hour to five hours;
after the first heating operation, performing a second heating operation of the one or more fibers in the oxygen-free atmosphere at temperature between 600° C. to 2000° C. for a time ranging from 1-5 hours; and
after the second heating operation, performing a cooling operation on the one or more fibers to room temperature;
wherein a temperature ramp rate for each operation of the pyrolysis treatment does not exceed 20° C./minute.

13. The method of producing one or more SAPC-CNT fibers of claim 1, wherein the choice of polymer precursor (PAN) of the electro spinning operation and the pyrolysis temperature is sufficient to cause the percentage of quaternary and pyridinic nitrogen groups to exceed 25%.

14. The method of producing or more SAPC-CNT fibers of claim 13, wherein the choice of polymer precursor (PAN) of the electro spinning operation and the pyrolysis temperature is sufficient to cause the percentage of quaternary and pyridinic nitrogen groups to exceed 90%.

15. The method of producing one or more SAPC-CNT fibers of claim 13, wherein the percentage of PAN to CNTs in the PAN-CNT precursor is between 0.5% to 5% by weight.

16. A method of producing one or more Stress Activated Pyrolytic Carbon-Carbon NanoTube (SAPC-CNT) based fibers, the fibers being a composite consisting of a tubular core of pristine graphite planes that include carbon nanotubes (CNTs) surrounded by semi-graphitic carbon material that includes Stress Activated Pyrolytic Carbon (SAPC), the SAPC being characterized by wavy graphite planes ranging from 0.1 nm to 1 nm and oriented parallel to the axis of each fiber, the semi-graphitic carbon material also being characterized by an inclusion of 4 to 10 atomic percent of nitrogen heteroatoms, the nitrogen heteroatoms including an above 60% of quaternary and pyridinic nitrogen groups, the method for producing the SAPC-CNT fibers comprising:
preparing a Polyacrylonitrile (PAN) based precursor solution infused with CNTs to produce a PAN-CNT precursor;
providing the PAN-CNT precursor solution to a spinneret;
performing an electrospinning operation on the PAN-CNT-based precursor solution to create the one or more fibers, wherein the electrospinning operation includes passing the PAN-CNT-based precursor solution from the spinneret to a collector while providing an Alternating Current (AC) voltage between the spinneret and the collector, the AC voltage having a frequency ranging from 1 Hz to 100,000 Hz and either a Peak-to-Peak (P-P) voltage ranging from 100V to 30,000V or a Root-Mean-Square (RMS) voltage ranging from 100V to 30,000V;
performing a post-electrospinning operation on the one or more fibers, the post-electrospinning operation including a mechanical treatment and a chemical treatment;
performing a stabilizing treatment on the one or more fibers, the stabilizing treatment including heating the one or more fibers; and
after performing the post-electrospinning operation and stabilizing treatment, performing a pyrolysis treatment on the one or more fibers, the pyrolysis treatment including heating the one or more fibers in an oxygen-free atmosphere.

* * * * *